(12) United States Patent
Marino

(10) Patent No.: US 6,731,303 B1
(45) Date of Patent: May 4, 2004

(54) HARDWARE PERSPECTIVE CORRECTION OF PIXEL COORDINATES AND TEXTURE COORDINATES

(75) Inventor: Richard Anthony Marino, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 417 days.

(21) Appl. No.: 09/594,630

(22) Filed: Jun. 15, 2000

(51) Int. Cl.[7] .................................................. G09G 5/00
(52) U.S. Cl. ........................................ 345/620; 345/619
(58) Field of Search ................................. 345/434, 502, 345/582, 506, 422, 586, 418, 620, 619; 710/116

(56) References Cited

U.S. PATENT DOCUMENTS

| | | | | |
|---|---|---|---|---|
| 5,805,868 A | * | 9/1998 | Murphy ...................... | 345/502 |
| 5,862,356 A | * | 1/1999 | Normoyle et al. .......... | 710/116 |
| 5,973,705 A | * | 10/1999 | Narayanswami ............ | 345/505 |
| 6,137,497 A | * | 10/2000 | Strunk et al. ............... | 345/434 |

OTHER PUBLICATIONS

The OpenGL Graphics System: A Specification (Version 1.2); Segal et al.; Mar. 23, 1998.

* cited by examiner

*Primary Examiner*—Matthew C. Bella
*Assistant Examiner*—Dalip K. Singh
(74) *Attorney, Agent, or Firm*—Duke W. Yee; Mark E. McBurney; Stephen J. Walder, Jr.

(57) ABSTRACT

A method and apparatus in a graphics system. The graphics system includes an input, wherein the input receives graphics data, wherein the graphics data includes position coordinates and a depth coordinate for an object. An output is present in which the output transmits processed graphics data. The graphics system also contains a plurality of processing elements, wherein the plurality of processing elements generates the processed graphics data. A first processing element within the plurality of processing elements is connected to the input and a last processing element within the plurality of processing elements is connected to the output. A selected processing element within the plurality of processing element receives the position coordinates and the depth coordinate, inverts the depth coordinate to form an inverted depth coordinate, and multiplies the position coordinates by the inverted depth coordinate.

7 Claims, 10 Drawing Sheets

| CLOCK | 0 | 1 | 2 | 3 | 4 | 5 | 6 | 7 | 8 | 9 | 10 | 11 |
|---|---|---|---|---|---|---|---|---|---|---|---|---|
| 1/W | $W_1$ | | | | | $W_2$ | | | | | $W_3$ | |
| | | | | | | | | | | | | |
| | | | | | | | | | | | | |
| | | | | | | | | | | | | |
| FIFO I | | | | | | 1/W | | | | | 1/W | |
| MUL A | | | | | | | | X/W | Y/W | Z/W | | |
| | | | | | | | | | X/W | Y/W | Z/W | |
| MUL B | | | | | | | | S1/W | T1/W | R1/W | | |
| | | | | | | | | | S1/W | T1/W | R1/W | |
| MUL C | | | | | | | | S2/W | T2/W | R2/W | | |
| | | | | | | | | | S2/W | T2/W | R2/W | |
| MUL D | | | | | | | | Q1/W | Q2/W | | | |
| | | | | | | | | | Q1/W | Q2/W | | |
| FIFO II | | | | | | | | | | | | X/W Y/W Z/W S1/W T1/W R1/W Q1/W S2/W T2/W R2/W Q2/W |

1302 ← table label; 1300 ← figure label

| FRAGMENT | AS USED IN GEOMETRY | AS USED IN RASTER |
|---|---|---|
| x, y, z, w | PRIMARY COORDINATE[1] | SCREEN COORDINATE |
| xAux, yAux, zAux, wAux | EYE COORDINATE[2] | n/a |
| s, t, r, q | TEXTURE COORDINATE | TEXTURE COORDINATE |
| fog | FOG FACTOR | FOG FACTOR |
| $f_{od}$, $f_s$ | n/a | FRONT AMBIENT/DIFFUSE COLOR, FRONT SPECULAR COLOR |
| $b_{od}$, $b_s$ | n/a | BACK AMBIENT/DIFFUSE COLOR, BACK SPECULAR COLOR |
| $cc_a$, $cc_r$, $cc_g$, $cc_b$ | CURRENT COLOR (ALPHA, RED, GREEN, BLUE) | n/a |
| $n_x$, $n_y$, $n_z$ | NORMAL VECTOR | n/a |
| PScc | SECONDARY CURRENT COLOR (PACKED ALPHA, RED, GREEN, BLUE) | n/a |
| $i_x$, $i_y$, $i_z$ | NORMALIZED EYE COORDINATE[3] | n/a |

FIG. 6

| STAGE | FRAGMENTS AFFECTED | ASSOCIATED COMMAND |
|---|---|---|
| NORMAL/MODEL VIEW TRANSFORMATION | xAux, yAux, zAux, wAux $n_x$, $n_y$, $n_z$ | ENABLE_NORMALXF ENABLE_MDLVWXF |
| NORMALIZATION | $n_x$, $n_y$, $n_z$ $i_x$, $i_y$, $i_z$ | ENABLE_NORMALIZEN ENABLE_TCGSPHERE |
| TEXTURE COORDINATE GENERATION | s, t, r, q | ENABLE_TCG |
| LIGHTING | $f_{od}$, $f_s$, $b_{od}$, $b_s$ | |
| TEXTURE/PROJECTION TRANSFORMATION | x, y, z, w s, t, r, q | ENABLE_TEXTUREXF ENABLE_PROJECTXF |
| CLIPPING | all | ENABLE_CLIPPING |
| FOG FACTOR GENERATION | fog | ENABLE_FOG |
| PERSPECTIVE DIVISION | x, y, z s, t, r, q | ENABLE_PERSDIV ENABLE_TEXPERSDIV |
| VIEWPORT TRANSFORMATION | x, y, z | ENABLE_VIEWPORTXF |

| INCOMING COORDINATE | X | Y | Z | W | S0 | T0 | R0 | Q0 | S1 | T1 | R1 | Q1 |
|---|---|---|---|---|---|---|---|---|---|---|---|---|
| OUTGOING COORDINATE | X/W | Y/W | Z/W | | S0/W | T0/W | R0/W | Q0/W | S1/W | T1/W | R1/W | Q1/ |

HARDWARE PERSPECTIVE CORRECTION OF PIXEL COORDINATES AND TEXTURE COORDINATES

BACKGROUND OF THE INVENTION

1. Technical Field

The present invention relates generally to improved data processing system and in particular to a method and apparatus for processing graphics data. Still more particularly, the present invention relates to a method and apparatus for correcting pixel coordinates and texture coordinates.

2. Description of Related Art

Data processing systems, such as personal computers and work stations, are commonly utilized to run computer-aided design (CAD) applications, computer-aided manufacturing (CAM) applications, and computer-aided software engineering (CASE) tools. Engineers, scientists, technicians, and others employ these applications daily. These applications involve complex calculations, such as finite element analysis, to model stress in structures. Other applications include chemical or molecular modeling applications. CAD/CAM/CASE applications are normally graphics intensive in terms of the information relayed to the user. Data processing system users may employ other graphics intensive applications, such as desktop publishing applications. Generally, users of these applications require and demand that the data processing systems be able to provide extremely fast graphics information.

The processing of a graphics data stream to provide a graphical display on a video display terminal requires an extremely fast graphics system to provide a display with a rapid response. In these types of graphics systems, primitives are received for processing and display. A primitive is a graphics element that is used as a building block for creating images, such as, for example, a point, a line, a triangle, a polygon, or a quadrilateral. A primitive is defined by a group of one or more vertices. A vertex defines a point, an end point of an edge, or a corner of a polygon where two edges meet. Data also is associated with a vertex in which the data includes information, such as positional coordinates, colors, normals, and texture coordinates. Commands are sent to the graphics system to define how the primitives and other data should be processed for display.

With the large amounts of data and computations involved in processing graphics data, especially with three-dimensional applications, many of these computations have been offloaded from the central processing units to a graphics adapter. These geometry calculations have been accelerated by using a multiprocessor system or a hardwired geometry engine in the graphics adapter. Multiprocessing allows flexibility to implement future processes or algorithms, but is difficult to program and adds to the cost and time needed to develop a graphics adapter. On the other hand, hardwired geometry engines are very straight forward to program. With hardwired geometry engines, it is desirable to optimize the hardware implementing these graphics functions within these engines to minimize the time needed to perform the graphic functions. Some of these functions include, for example, transforming coordinates from one coordinate system to another coordinate system, scaling coordinates, clipping objects, and rotating objects.

Therefore, it would be advantageous to have an improved method and apparatus for implementing graphic functions in a manner that reduces the time needed to perform these functions.

SUMMARY OF THE INVENTION

The present invention provides a method and apparatus in a graphics system. The graphics system includes an input, wherein the input receives graphics data, wherein the graphics data includes position coordinates and a depth coordinate for an object. An output is present in which the output transmits processed graphics data. The graphics system also contains a plurality of processing elements, wherein the plurality of processing elements generates the processed graphics data. A first processing element within the plurality of processing elements is connected to the input and a last processing element within the plurality of processing elements is connected to the output. A selected processing element within the plurality of processing element receives the position coordinates and the depth coordinate, inverts the depth coordinate to form an inverted depth coordinate, and multiplies the position coordinates by the inverted depth coordinate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
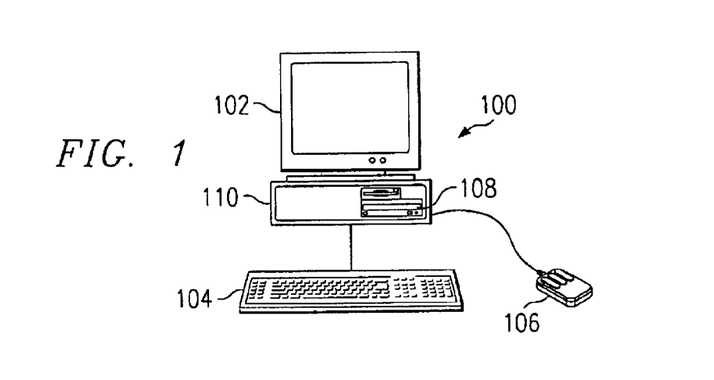
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
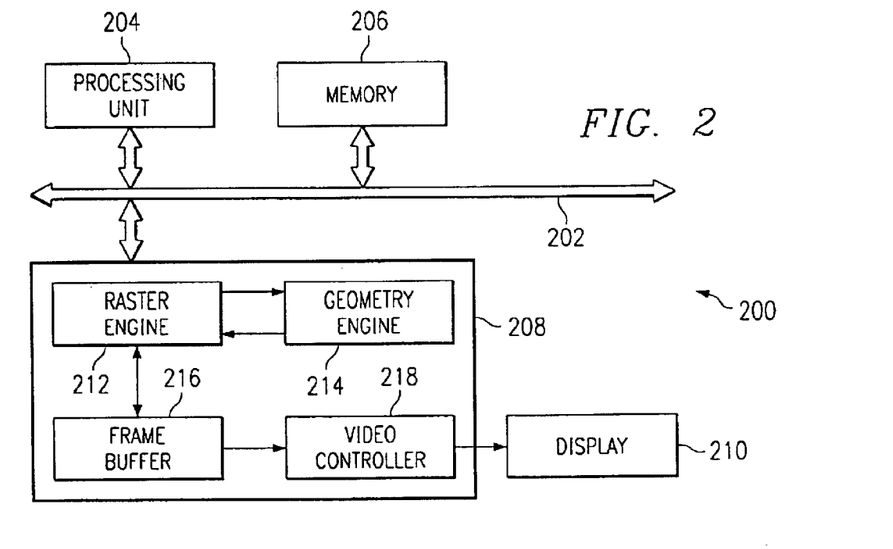
FIG. 2 is a block diagram of a data processing system in accordance with a preferred embodiment of the present invention.

Turning next to FIG. 2, a block diagram of a data processing system is depicted in accordance with a preferred embodiment of the present invention. Data processing system 200 is an example of components used in a data processing system, such as computer 100 in FIG. 1. Data processing system 200 employs a bus 202 in the form of a peripheral component interconnect (PCI) local bus architecture. Although the depicted example employs a PCI bus, other bus architectures such as Accelerated Graphics Port (AGP) and Industry Standard Architecture (ISA) may be used. Processing unit 204, memory 206, and graphics adapter 208 are connected to bus 202 in these examples. Processing unit 204 includes one or more microprocessors in the depicted example.

Graphics adapter 208, in this example, processes graphics data for display on display device 210. The graphics data is received from applications executed by processing unit 204. Graphics adapter 208 includes a raster engine 212, a geometry engine 214, a frame buffer 216, and a video controller 218. Raster engine 212 receives the graphics data from the application. In these examples, raster engine 212 contains the hardware and/or software used to rasterize an image for display. Raster engine 212 is used to turn text and images into a matrix of pixels to form a bitmap for display on a screen. In the depicted example, raster engine 212 sends the received graphics data to geometry engine 214, which provides the functions for processing primitives and other graphics data to generate an image for raster engine 212 to process. The processed data is then passed back to raster engine 212. The mechanisms of the present invention are located in geometry engine 214 in these examples.

Frame buffer 216 is an area of memory used to hold a frame of data. Frame buffer 216 is typically used for screen display and is the size of the maximum image area on the screen. Frame buffer 216 forms a separate memory bank on graphics adapter 208 to hold a bit map image while it is "painted" on a screen. Video controller 218 takes the data in frame buffer 216 and generates a display on display 210. Typically, video controller 218 will cycle through frame buffer 216 one scan line at a time.

Figure 3:
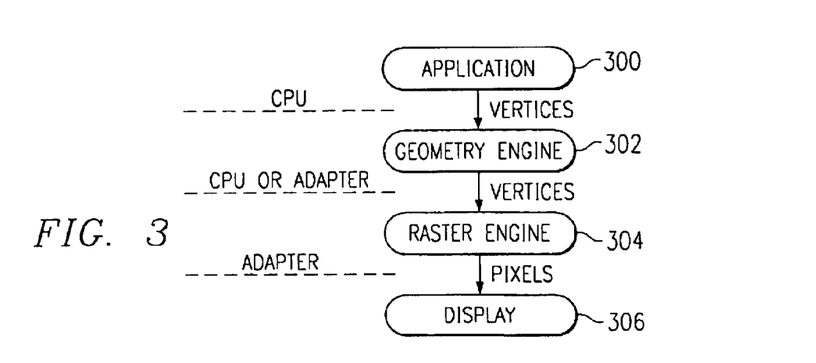
FIG. 3 is a diagram illustrating processing graphics data in accordance with a preferred embodiment of the present invention.

Turning now to FIG. 3, a diagram illustrating processing of graphics data is depicted in accordance with a preferred embodiment of the present invention. Processing of graphics data can be divided into three stages. In the first stage, application 300 generates graphics data for display. The stages always run on the main central processing unit of the computer, such as, for example, processing unit 204 in FIG. 2. The data generated is used to represent an object as a series of points or vertices that are connected in a predetermined fashion based on the type of primitive application 300 is currently rendering. The second stage involves geometry engine 302, which is responsible for transforming incoming vertices received from application 300 into a form for viewing on a display. Typically, along with the transforming vertices, geometry engine 302 is responsible for generating color contributions from lighting sources, generating fog factors that allow an object to become less visible based on the distance from the viewer, and clipping a scene to a given view volume. Geometry engine 302 may be implemented either in a central processing unit or an adapter. In these examples, geometry engine 302 is implemented as geometry engine 214 and graphics adapter 208 in FIG. 2. The third stage, raster engine 304, takes the vertices that have been transformed into screen coordinates and interpolates the colors or maps an image between the vertices to turn a vertex representation of an object into a solid object. In this example, raster engine 304 may be implemented as raster unit 212 in graphics adapter 208 in FIG. 2. This information is then sent to display 306. In the depicted examples, geometry engine 302 is a hardwired geometry engine as opposed to a multi-processor engine.

The present invention provides an apparatus to perform coordinate correction functions, which are normally performed in software. More specifically, the mechanism of the present invention provides an ability to correct both pixel coordinates and texture coordinates within geometry engine 214 in FIG. 2. Pixel coordinates are X, Y, and Z coordinates, while texture coordinates are S, T, R, and Q coordinates. The present invention provides an improved method and apparatus for correcting or manipulating these coordinates within a single stage or processing element within geometry engine 302 in FIG. 3 in these examples. These functions are implemented in a single processing element within geometry engine 302 in these examples.

Figure 4A:
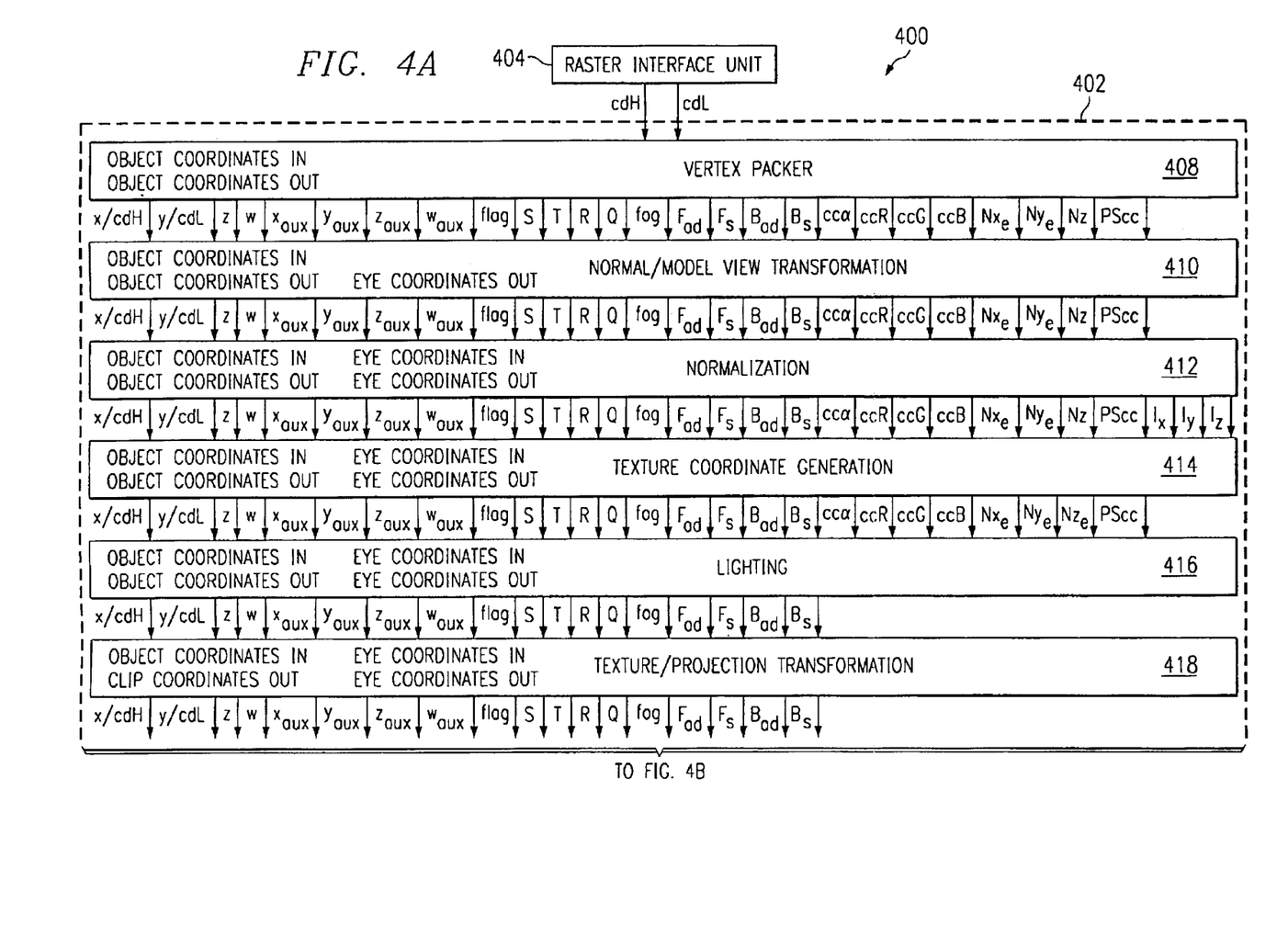
FIGS. 4A and 4B, is a block diagram of a geometry engine in accordance with a preferred embodiment of the present invention.
Figure 4B:
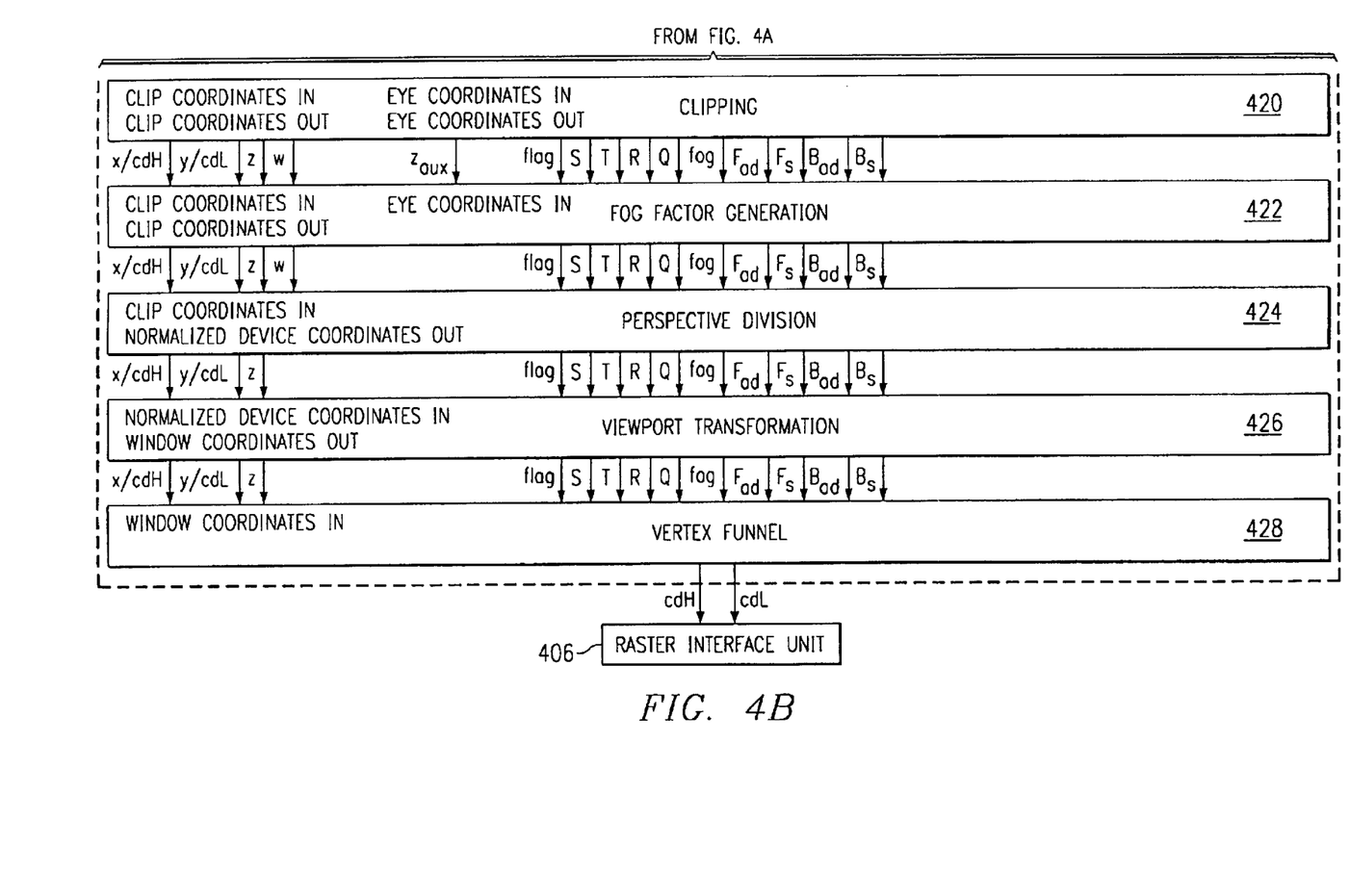

Turning now to FIGS. 4A and 4B, a block diagram of a geometry engine is depicted in accordance with a preferred embodiment of the present invention. Geometry engine 400 illustrates stages or processing elements, which may be implemented in a geometry engine, such as geometry engine 214 in FIG. 2. Geometry engine 400, in this example, includes a geometry unit 402, a raster interface unit 404, and a raster interface unit 406. Data is received by raster interface unit 404 for processing within geometry unit 402. The data is received from a raster engine, such as raster engine 210 in FIG. 2. Processed data is returned to the raster engine using raster interface unit 406. The mechanism of the present invention is implemented within the processing elements in geometry unit 402. Specifically, the processing elements implement equations in hardware to process graphics data. The mechanism of the present invention reduces the complexity of the hardware by optimizing the equations in a simpler form and implementing these simplified equations in the processing elements.

Geometry unit 402, in this example, is a graphics pipeline containing a set of processing elements, which include a vertex packer unit 408, a normal/model view transformation unit 410, a normalize unit 412, a texture coordinate generation unit 414, a lighting unit 416, a texture/projection transformation unit 418, a clipping unit 420 in FIG. 4B, a fog factor generation unit 422, a perspective divide unit 424, a viewport transformation unit 426, and a vertex funnel unit 428. These processing elements also are referred to as "stages".

Vertex packer unit 408 is the top stage of a geometry unit and assembles attribute fields for a vertex. A vertex defines a point, an end point of an edge, or a corner of a polygon where two edges meet. Each vertex contains every possible fragment of data used by any stage in the geometry pipeline. These fragments are data, such as, for example, positional coordinates, colors, normals, and texture coordinates. Normal/model view transformation unit 410 in FIG. 4A is used to transform a normal vector from object space into eye space. The transformation is dependent on the model view transformation, which is an inverse transpose of the model view matrix. The model view transformation in normal/model view transformation unit 410 transforms object coordinates into eye coordinates by translating, scaling, and rotating objects.

Normalize unit 412 changes the normal vector to a vector of unit length, having a magnitude of 1.0, while preserving the direction of the original vector. Texture coordinate generation unit 414 generates texture coordinates used for displaying texture for a primitive. Texture coordinate generation unit 414 generates texture coordinates, such as object linear, eye linear, and spherical.

Lighting unit 416 computes shading and colors for each vertex. Specifically, lighting unit 416 generates the color of each vertex of an object based on the orientation of the object, the material properties of the object, the properties of the scene, and any defined light sources. Texture/projection transformation unit 418 transforms texture coordinates by translating, scaling, and rotating objects. Additionally, texture/projection transformation unit 418 transforms eye coordinates into clip coordinates, moving objects into a "viewing volume", by translating, scaling, and rotating objects. Typically this volume is a cube with extents of ±W that is orthogonal to the XYZ coordinate system. Prospective projection makes an object further away appear smaller, while orthogonal projection does not make objects appear smaller when they are further away.

In FIG. 4B, clipping unit 420 clips objects to a viewing volume. Fog factor generation unit 422 is used to make an object fade into the distance (atmospheric effects) by making objects further away from the viewer less visible.

Perspective divide unit 424 is used to transform clip coordinates to normalize device coordinates [−1, +1] by dividing a fourth coordinate W. The mechanism of the present invention is implemented within perspective divide unit 424 in these examples. The mechanism of the present invention provides for correction of both pixel coordinates (X, Y, and Z) and texture coordinates (S, T, R, and Q) using W. Viewpoint transformation unit 426 is used to transform normalized device coordinates into screen or window coordinates. Device coordinates are coordinates used by the adapter to display images. Normalized device coordinates are device coordinates that are normalized to between 0 and 1.

Further, the mechanism of the present invention adjusts these coordinates using multiplication, rather than division. Instead of dividing the coordinates by the depth value W, a reciprocal of the depth value W is generated. This reciprocal, 1/W is multiplied with the pixel coordinates and texture coordinates. In addition, the mechanism of the present invention uses two stages. In the first stage the reciprocal of the depth value W occurs. A first FIFO in this stage is used to hold the pixel coordinates and the texture coordinates until the reciprocal of the depth value is generated. When the second stage receives the reciprocal of W and the pixel coordinates and the texture coordinates, multiplication of the pixel coordinates and the texture coordinates occurs. The mechanism of the present invention allows for multiplication of all of these coordinates in the same amount of time, which is five clock cycles in this example.

Vertex funnel unit 428 takes fragments of vertices and places them on a bus for use by the raster interface unit. In this example, the fragments are funneled into a 64-bit data word for transfer on the bus.

The fragments and stages illustrated in geometry unit 402 in FIG. 4A are based on fragments and operations specified in OpenGL, which is defined in The OpenGL Graphics System: A Specification (Version 1.2), which is available from Silicon Graphics, Inc.

In this example, geometry engine 400 received data at vertex packer unit 408 one word at a time. The resulting vertex is sent to the raster engine one word at a time.

Figure 5:
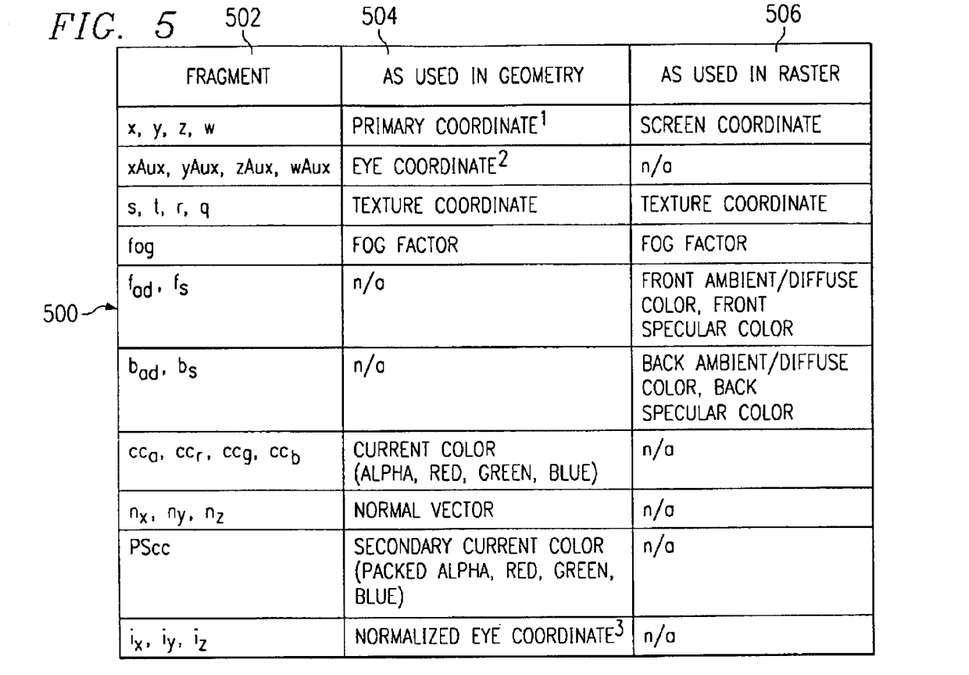
FIG. 5 is a diagram illustrating vertex fragment descriptions in accordance with a preferred embodiment of the present invention.

Turning now to FIG. 5, a diagram illustrating vertex fragment descriptions is depicted in accordance with a preferred embodiment of the present invention. Table 500 illustrates different fragments, which make up a vertex. Column 502 illustrates fragments and their uses in a geometry engine in column 504 and in a raster engine in column 506. These fragments are assembled in vertex packer 408 in FIG. 4A and contain the information used to describe that particular vertex.

As a vertex travels through a geometry pipeline, such as geometry engine 400, a given fragment, such as those illustrated in FIG. 4A may be updated based on the programming of the stage to affect that particular fragment. When a fragment no longer has meaning to subsequent stages, the fragment ceases to be passed down the pipeline. Each stage or processing element in a geometry pipeline is programmed with a simple enable command to either affect a given vertex fragment or pass that data from the previous stage to its output.

Figure 6:
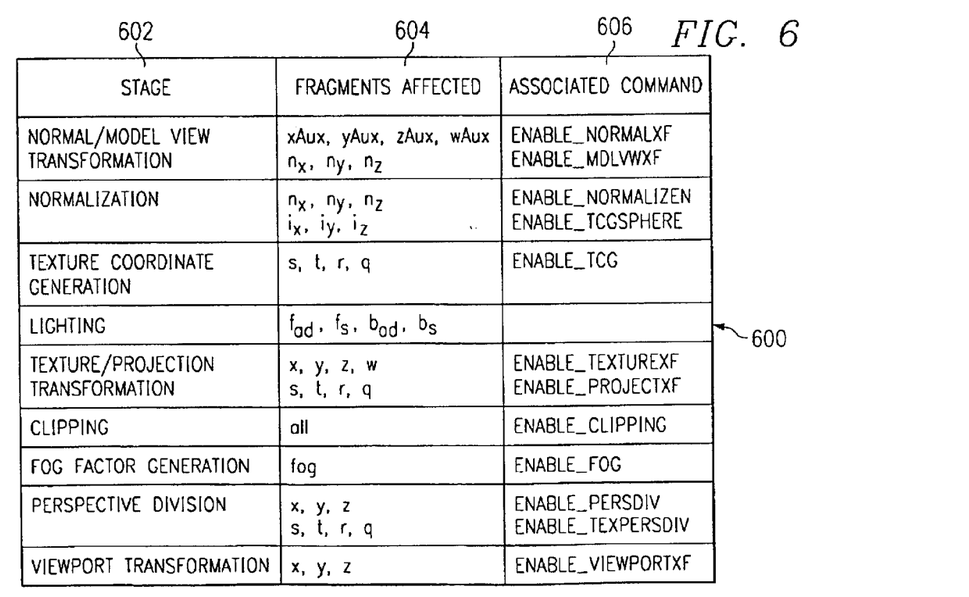
FIG. 6 is a table illustrating fragments affected in a particular stage in accordance with a preferred embodiment of the present invention.

Turning to FIG. 6, a table illustrating fragments affected in a particular stage is depicted in accordance with a preferred embodiment of the present invention. Table 600 illustrates a breakdown of stages, such as those in geometry engine 400 in FIG. 4A, and fragments that may change based on the programming of a particular stage. Table 600 includes a column 602 identifying in different stages. Fragments affected are illustrated in column 604, which identifies different fragments that are affected by commands shown in column 606. These commands are used to enable and disable processing of various fragments in the stages identified in table 600. In particular, the illustrated example below shows selective enabling of a lighting stage as well as an ability to combine fragments $f_{ad}$, $f_s$, $b_{ad}$, and $b_s$ with data generated by the lighting stage.

Figure 7:
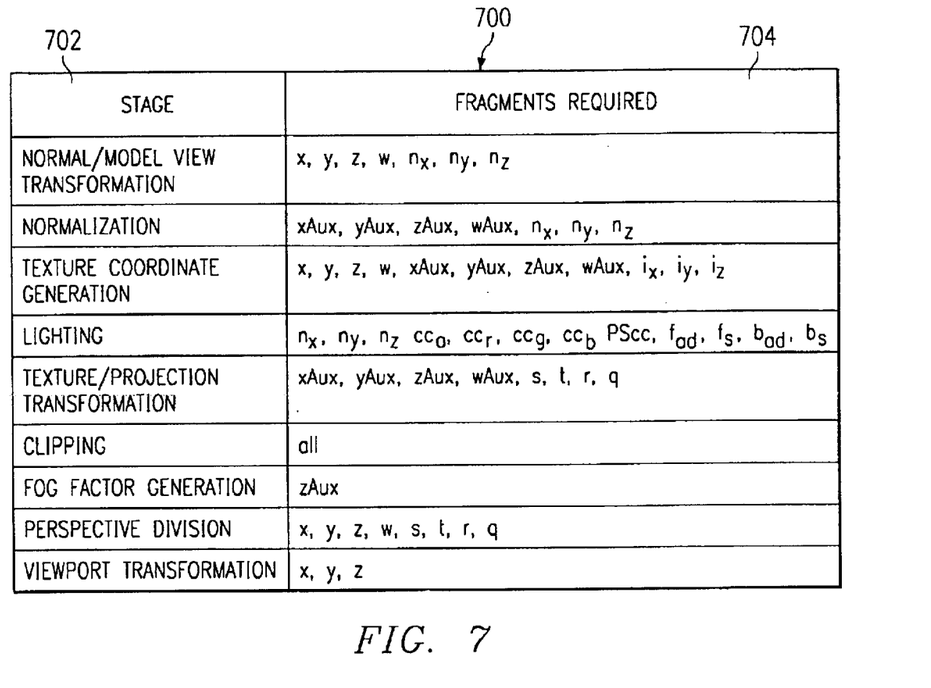
FIG. 7 is a table illustrating fragments required in a particular stage in accordance with a preferred embodiment of the present invention.

In FIG. 7, a table illustrating fragments required in a particular stage is depicted in accordance with a preferred embodiment of the present invention. Table 700 illustrates stages in column 702 and the fragments required for each stage in column 704. In this example, the lighting stage generates lighting effects using the following fragments: $n_x$, $n_y$, $n_z$, $cc_a$, $cc_r$, $cc_g$, $cc_b$, and PScc. The fragments $f_{ad}$, $f_s$, $b_{ad}$, and $b_s$ are those received from a source outside of the pipeline, such as an application executing on a host processor. The mechanism of the present invention allows for just selecting the output from the lighting stage or combining that output with the fragments received from the source. Alternatively, the fragments received from the source may be passed through the lighting stage unaffected.

Figure 8:
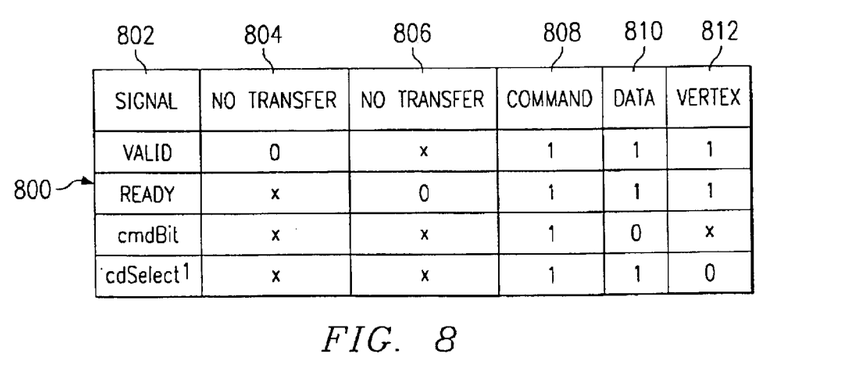
FIG. 8 is a table illustrating signals used to transfer data between stages in accordance with a preferred embodiment of the present invention.

Turning now to FIG. 8, a table illustrating signals used to transfer data between stages is depicted, in accordance with a preferred embodiment of the present invention. Data transfer between stages is used to pass two types of data in these examples, command data and vertex data. Two types of commands may be transferred. One is a command data pair containing a word of command and a word of data. Another type of command involves data strands in which a word of command is present and multiple words of data are present.

Table 800 illustrates a set of signals valid, ready, cmdBit, and cdSelect used to transfer data between stages in column 802. Whether a transfer is to occur is illustrated in columns 804 and 806. Applicability of a signal to transfer a command is illustrated in column 808. Applicability of the signal to transfer a word of data is shown in column 810. Applicability in transferring a vertex is shown in column 812. The valid signal indicates that there is either a command, data, or vertex that needs to be sent to the subsequent stage. The ready signal indicates whether a stage is ready to transfer data. As can be seen, this signal is applicable to command, data, and vertices. The signal cmdBit indicates that a command is to be transferred over the interface. The signal cdselect is used to indicate whether command data, rather than vertex data is present. These signals take into account that commands as well as x and y coordinates data are sent over the same lines within geometry unit 402 in FIG. 4A.

Figure 9A:
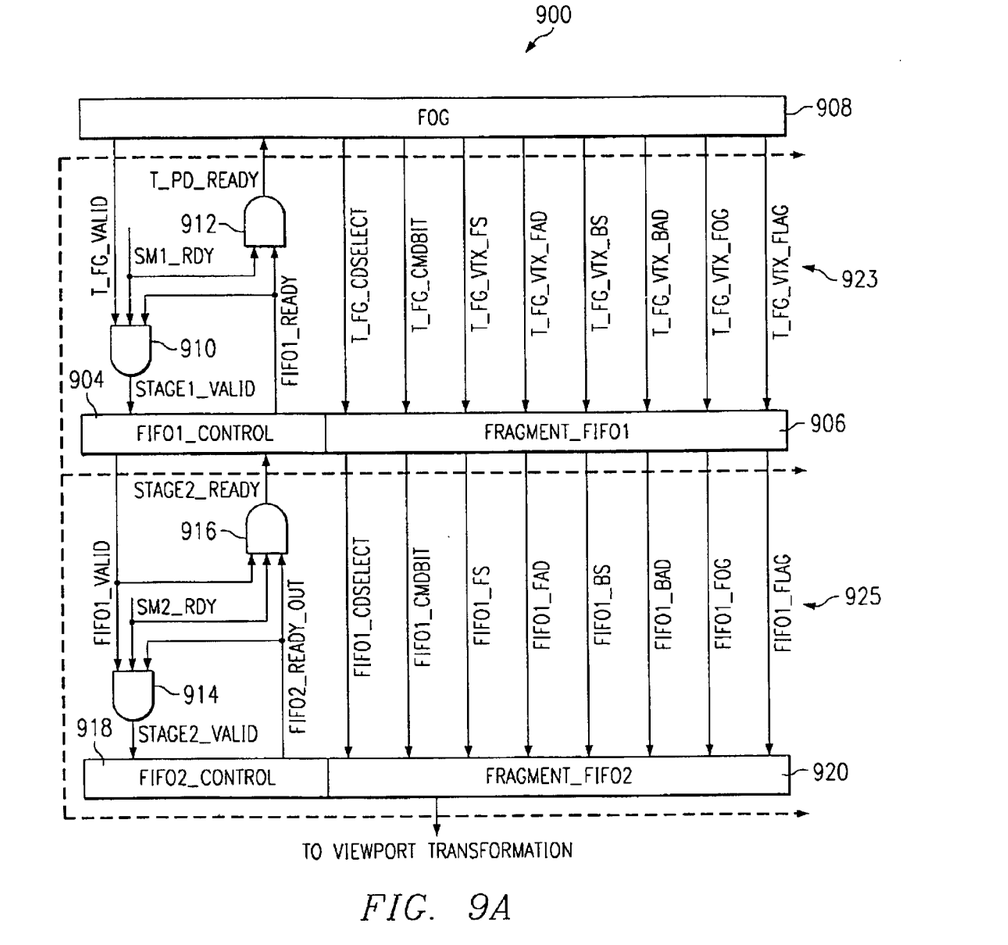
FIGS. 9A and 9B are block diagrams of a perspective division unit in accordance with a preferred embodiment of the present invention.
Figure 9B:
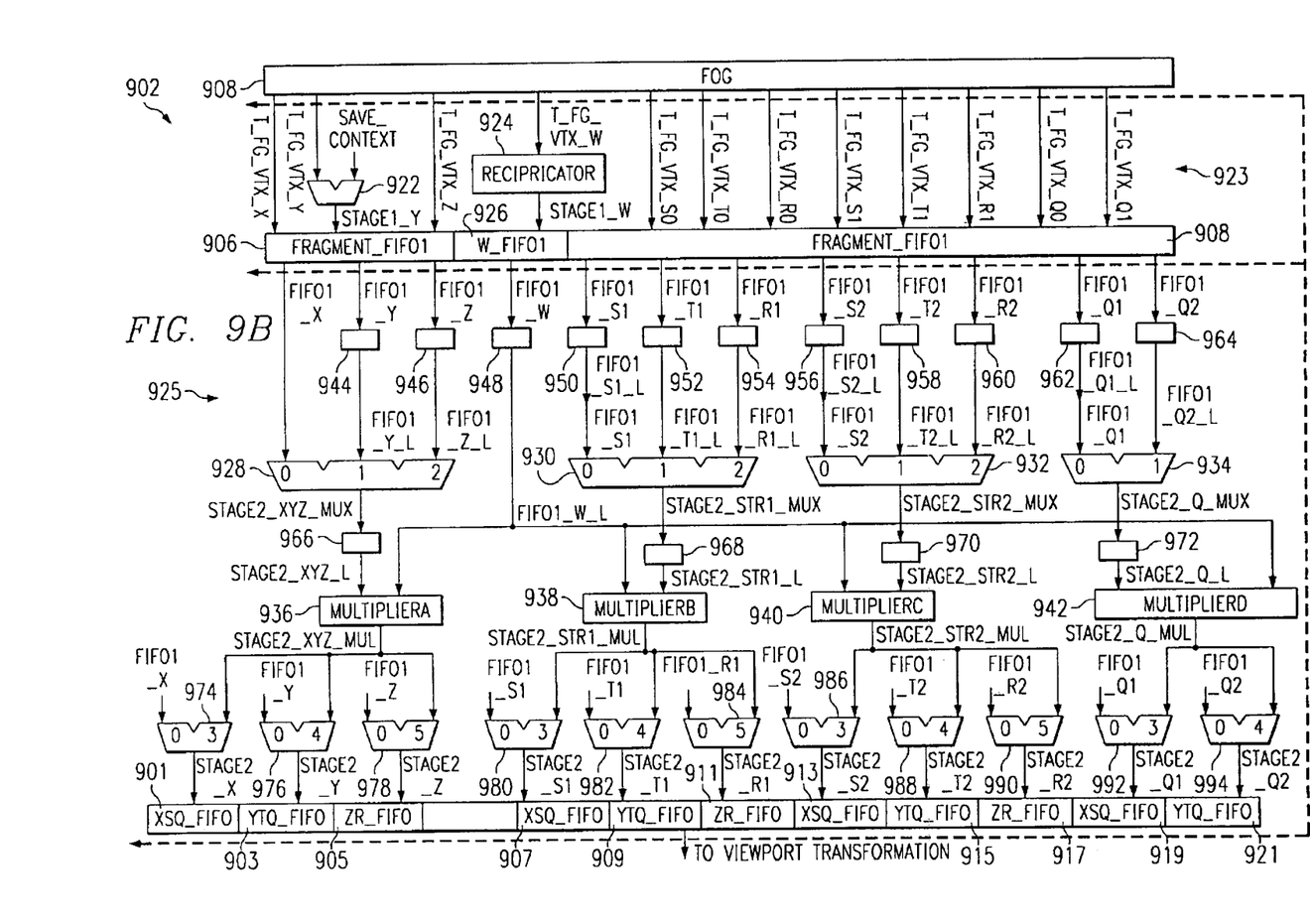

Turning now to FIGS. 9A and 9B, a block diagram of a perspective division unit is depicted in accordance with a preferred embodiment of the present invention. Section 900 and section 902 provide a more detailed illustration of perspective division unit 424 in FIG. 4B.

In identifying signals in these figures, T_FG indicates that the signal is for the factor generation unit, and VTX is for vertex. Section 900 of the perspective division unit forms a pass through section for this unit. Section 902 performs the perspective division of pixel coordinates and texture coordinates in accordance with a preferred embodiment of the present invention. Further, the perspective division unit contains two stages, a first stage 923 and a second stage 925. First stage 923 is the stage in which a reciprocal of the depth value, W, is generated. Second stage 925 is the stage in which the multiplication of the reciprocal of the depth value is multiplied with the pixel coordinates and the texture coordinates.

In section 902, control data is stored in FIFO1 control 904. This control data includes various vertex streaming commands, such as ENABLE_PERSPECTIVEDIVISION, GE_TEX_PARMS0, GE_TEX_PARMS1, SHD_TEX_PARMS0, SHD_TEX_PARMS1, and SAVE/RESTORE CONTEXT. ENABLE_PERSPECTIVEDIVISION is a command used to enable processing within the perspective division unit. GE_TEX_PARMS0 is a command used to enable and disable divide operations for texture coordinate variables, S0, T0, R0, and Q0 when the perspective division unit is enabled. GE_TEX_PARMS1 is a command used to enable and disable divide operations for texture coordinate variables, S1, T1, R1, and Q1 when the perspective division unit is enabled. SHD_TEX_PARMS0 is a command used to enable and disable divide operations for texture coordinate variables, S0, T0, R0, and Q0 when the perspective division unit is enabled. SHD_TEX_PARMS1 is a command used to enable and disable divide operations for texture coordinate variables, S1, T1, R1, and Q1 when the perspective division unit is enabled. SAVE/RESTORE CONTEXT is a command used to save or restore three bits in a 32-bit word. In these examples, the three bits are for enabling perspective division, enabling processing of a first set of texture coordinates, and enabling processing of a second set of texture coordinates. These commands are passed through T_FG_VTX_X and T_FG_VTX_Y. The command may be passed through T_FG_VTX and T_FG_VTX_Y.

Pass through fragments are stored in fragment FIFO1 906. FIFO1 control 904 and fragment FIFO1 906 are part of the first stage in the perspective division unit. This control data and the fragments are received from fog factor generation unit 908, which is a fog factor generation unit, such as fog factor generation unit 422 in FIG. 4B. AND gate 910 receives control data, such as a valid signal indicated by T_FG_VLD. Additionally, a control signal, SM1_RDY, and a ready signal, FIFO1_ready, are input into AND gate 910. The ready signal is generated when fragment FIFO1 has room to receive additional fragments. SM1_ready is received from a state machine, which is described in more detail in FIG. 11 below. AND gate 912 is used to generate a ready signal, T_PD_ready, to fog factor generation unit 908 when the perspective division unit is ready to receive additional fragments for processing. AND gate 912 receives an SM1_RDY signal from the state machine and a FIFO1_ready signal from FIFO1 control 904.

AND gate 914 and AND gate 916 are used to transfer fragments and control data from FIFO1 control 904 and fragment FIFO1 906 to FIFO2 control 918 and fragment FIFO2 920. FIFO2 control 918 and fragment FIFO2 920 form a second stage in the perspective division unit.

AND gate 914 receives a valid signal, FIFO1_valid, a ready signal, FIFO2_ready_out, and an SM2_RDY signal. The valid signal is generated by FIFO1 control 904 when W has been inverted. The ready signal is generated by FIFO2 control 918 when the viewport transformation stage is ready to receive data. The SM2_RDY signal is generated by a state machine, which is described in more detail below with respect to FIG. 12. AND gate 914 generates valid signal, STAGE2_VALID, when all the data, has been received and the calculations have been completed.

In FIG. 9B, pixel coordinates and texture coordinates are received in fragment FIFO1 906 in section 902 of the perspective division unit. Pixel coordinates for coordinates X, Y, and Z are received by fragment FIFO1 906 as indicated by signals T_FG_VTX_X, T_FG_VTX_Y, and T_FG_VTX_Z, respectively. Additionally, multiplexer 922 receives a Y coordinate, T_FG_VTX_Y, and a save context signal. Multiplexer 922 is used to switch between new and restored data. Texture coordinates S, T, R, and Q also are received in fragment FIFO1 906. In this example, two sets of texture coordinates may be received, as indicated by signals T_FG_VTX_S0, T_FG_VTX_T0, T_FG_VTX_R0, T_FG_VTX_Q0, T_FG_VTX S1, T_FG_VTX_T1, T_FG_VTX_R1, and T_FG_VTX_Q1. The values for these texture coordinates are output as texture coordinates S1, T1, R1, Q1, S2, T2, R2, and Q2, respectively. A depth value W also is received from fog factor generation unit 908 as indicated by signal T_FG_VTX_W. This depth value is processed by reciprocator 924 prior to being placed into W FIFO1 926, which is part of fragment FIFO1 906. Reciprocator 924 generates a reciprocal of the depth value to form 1/W, as indicated by signal stage 1_W. Reciprocator 924 generates a reciprocal of W in five clock cycles in the depicted examples.

Multiplexers 928, 930, 932, and 934 are used to select data for multipliers 936, 938, 940, and 942, respectively. These multiplexers receive data from fragment FIFO1 906. Latches 944–964 are used to hold data prior to sending the data to the multiplexers. Latches 966–972 are used to hold data from latches 928–934 prior to sending the data to the multipliers. Multiplexer 928 receives pixel coordinates X, Y, and Z. Multiplexer 930 receives texture coordinates S1, T1, and R1, while multiplexer 932 receives texture coordinates S2, T2, and R2. Multiplexer 934 is used to received texture coordinates Q1 and Q2.

Multiplier A 936 multiplies the pixel coordinates with the inverted depth value from W FIFO1 926. One of the pixel coordinates is sent to multiplier A 936 each clock cycle. Multiplication of the pixel coordinates by multiplier A 936 takes place over three clock cycles. In this example, the pixel coordinates are multiplied by the inverted depth value W in the following order: X, Y, and Z in these examples. During the time in which the X coordinate value is being multiplied by 1/W, latches 944 and 946 latch values for Y and Z. In the next clock cycle, the value for Z is latched in latch 946, while the Y value is being multiplied by 1/W in multiplier A 936. In the third clock cycle, the coordinate value for Z is multiplied by 1/W. In these examples, multipliers A 936, multiplier B 938, multiplier C 940, and multiplier D 942 multiply values using a two value or two clock cycle operation. As a result, processing of the pixel coordinates by multiplier A 936 takes five clock cycles.

Multiplier B 938 is used to multiply texture coordinates S1, T1, and R1 by 1/W. These coordinates are all processed within three clock cycles. The coordinates are multiplied in the following order in these examples: S1, T1, and R1. Multiplier C 940 is used to multiply texture coordinates S2, T2, and R2 by 1/W. These coordinates are all processed within three clock cycles. The coordinates are multiplied in the following order in these examples: S2, T2, and R2. Multiplier D 942 is used to multiply the texture coordinates Q1 and Q2 by 1/W. The multiplication of these two coordinates is performed over two clock cycles with coordinate Q1 being multiplied first in these examples.

The outputs from multipliers A 936, multiplier B 938, multiplier C 940, and multiplier D 942—are sent to multiplexers 974–994. These multiplexers are used to send the processed pixel and texture coordinates to the appropriate places within fragment FIFO2 920. These FIFO entries are located in fragment FIFO 920. The pixel coordinates are placed into FIFO entries 901, 903, and 905. The texture coordinates are placed into FIFO entries 907–921.

Further, multiplexers 974–994 may be used to receive values directly from fragment FIFO1 906 in the case that the perspective division unit is disabled. In this case, the values from fragment FIFO1 906 are passed directly to fragment FIFO2 920. From fragment FIFO2 920, these values are passed to a viewport transformation unit, such as viewport transformation unit 426 in FIG. 4B.

Figure 10:
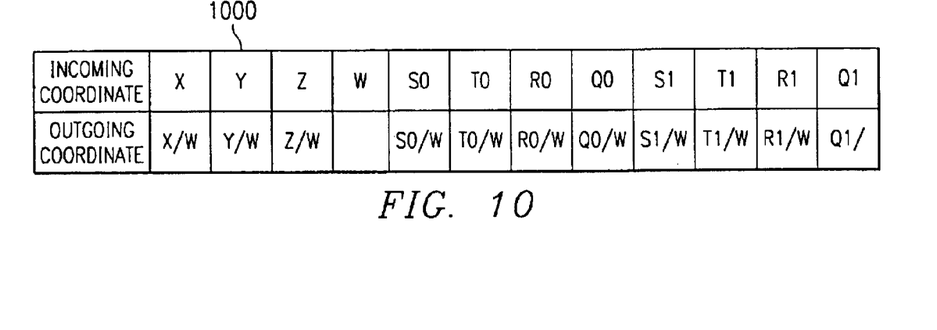
FIG. 10 is a diagram illustrating incoming coordinates and outgoing coordinates in accordance with a preferred embodiment of the present invention.

Turning now to FIG. 10, a diagram illustrating incoming coordinates and outgoing coordinates is depicted in accordance with a preferred embodiment of the present invention. Table 1000 illustrates incoming coordinate variables for pixel coordinates and texture coordinates. These are values received by a perspective division unit, such as the perspective division unit illustrated in FIGS. 9A and 9B. Incoming pixel coordinate variables are X, Y, and Z, while the incoming texture coordinate variables are S0, T0, R0, Q0, S1, T1, R1, and Q1. Further, a depth value W is used in the perspective division unit. Outgoing pixel coordinates are X/W, Y/W, and Z/W. The outgoing texture coordinates are S0/W, T0/W, R0/W, Q0/W, S1/W, T1/W, R1/W, and Q1/W. As described above, an inverted depth value for W is multiplied with the incoming coordinates in these examples.

Figure 11:
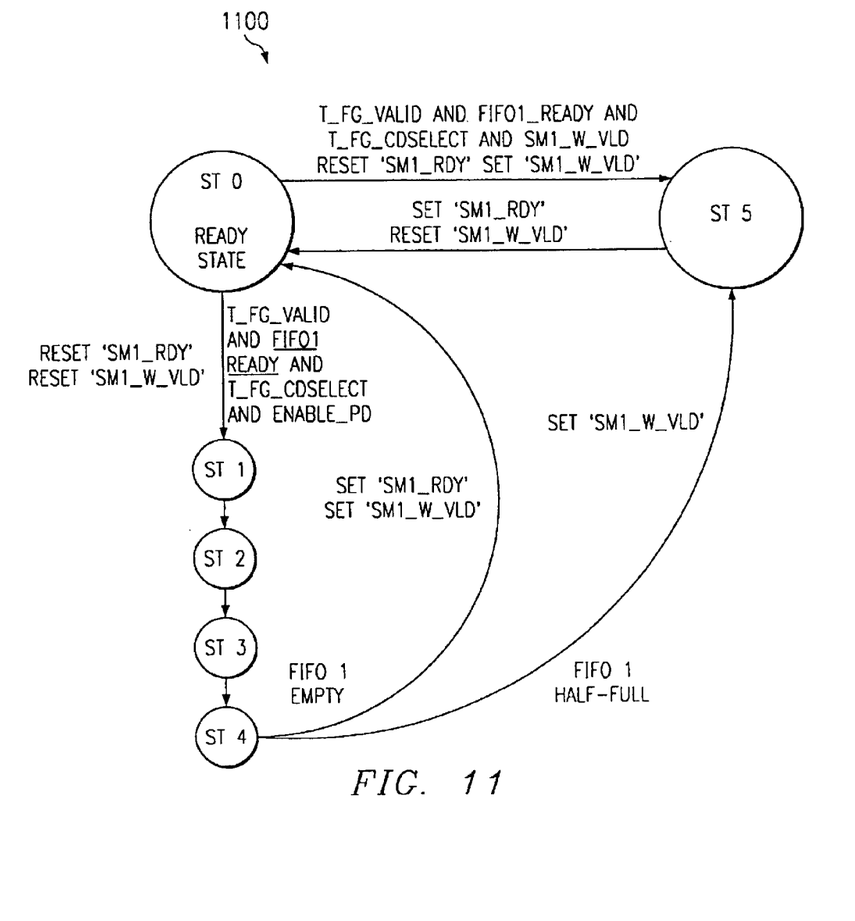
FIG. 11 is a diagram of a state machine used to control a first stage in the perspective division unit in accordance with a preferred embodiment of the present invention.

Turning now to FIG. 11, a diagram of a state machine used to control a first stage in the perspective division unit is depicted in accordance with a preferred embodiment of the present invention. State machine 1100 is an example of a state machine, which may be used to handle a first stage, such as that formed by FIFO1 control 904 and fragment FIFO1 906 in FIGS. 9A and 9B. More specifically, state machine 1100 is used to handle reciprocation of the depth value W. The various signals illustrated in state machine 1100 correspond to the signals illustrated in FIGS. 9A and 9B.

The process begins in ready state ST0 and proceeds to state ST1 if T_FG_VALID, FIFO1_READY, /T_FG_CDSELECT, and ENABLE_PD. The ENABLE_PD is used to enable the stage to function. T_FG_CDSELECT is the cdselect command illustrated in FIG. 8. The symbol "/" indicates that the signal T_FG_CDSELECT is in a not or inverted state. In response to these conditions, state machine 1100 resets SM1_RDY and SM1_W_VLD, which are ready and valid signals respectively. The ready signal is sent to AND gate 910 in FIG. 9 and indicates the system is ready to receive data. When it is reset, the system is not ready to receive data. Thereafter, state machine 1100 shifts from ST1 to state ST2 and then to state ST3 and to state ST4 on each clock cycle. These states represent the clock cycles during which the depth value W is inverted. In other words, each state shift occurs on a clock cycle.

State machine 1100 shifts to state ST5 if FIFO1, such as fragment FIFO1 906 in FIGS. 9A and 9B, is half full. The fog factor generation unit in this example contains two stages. When a first vertex is received, the unit is half full and is able to receive one more vertex for processing. The valid signal is to tell FIFO 926 in FIG. 9 to load the data from reciprocator 924. If FIFO1 is empty, state machine 1100 shifts from state ST4 back to ready state ST0 and sets SM1_RDY and SM1_W_VLD. In this example, all active signals are high. For example, a signal is ready if the signal is high.

In state ST5, state machine 1100 returns to state ST0 and sets the signal SM1_RDY and resets the signal SM1_W_VLD. From state ST0, state machine 1100 may shift to state ST5 if T_FG_VALID, FIFO1_READY, T_FG_CDSELECT, and SM1_W_VLD. In shifting from ready state ST0 to state ST5, state machine 1100 sets SM1_RDY and resets SM1_W_VLD.

Figure 12:
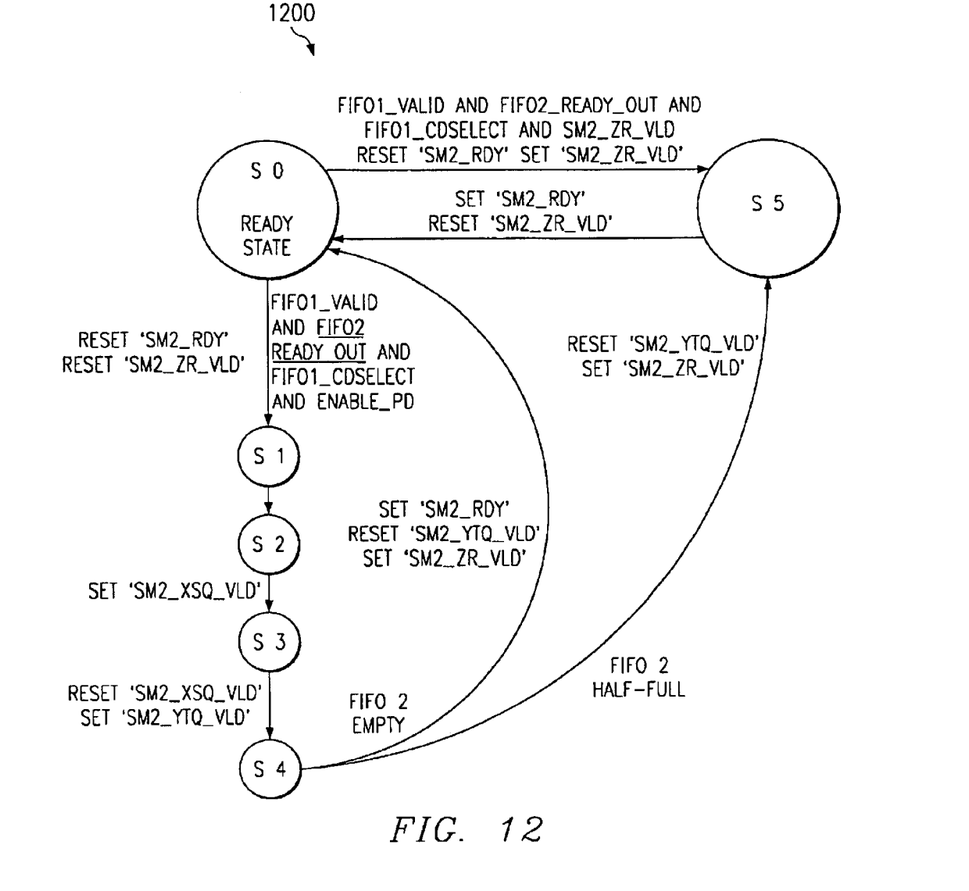
FIG. 12 is a diagram of a state machine used to control a second stage in the perspective division unit in accordance with a preferred embodiment of the present invention.

Turning now to FIG. 12, a diagram of a state machine used to control a second stage in the perspective division unit is depicted in accordance with a preferred embodiment of the present invention. State machine 1200 is an example of a state machine, which may be used to handle a second stage, such as that formed by FIFO2 control 918 and fragment FIFO2 920 in FIGS. 9A and 9B. More specifically, state machine 1200 is used to handle multiplication of the pixel coordinates and texture coordinates with the inverted depth value generated in the first stage.

State machine 1200 begins in ready state S0 and shifts to state S1 if FIFO_VALID, FIFO2_READY OUT, /FIFO1_CDSELECT, and ENABLE_PD are present. In shifting to state S1, state machine 1200 resets SM2_RDY and SM2_ZR_VLD. The SM2_RDY signal indicates the system is all ready to receive for processing. Resetting this signal indicates that processing is occurring and data cannot be received. The SM2_ZR_VLD indicates that the Z value has been multiplied and needs to be put into the FIFO. State machine 1200 then shifts to state S2. In shifting from state S2 to state S3, state machine 1200 sets SM2_XSQ_VLD. State machine 1200 shifts from state S3 to state S4 and resets SM2_XSQ_VLD and sets SM2_YTQ_VLD. These two signals indicate that x and y values have been processed and are ready to be placed in the FIFO. When a signal is reset, it is no longer ready.

From state S4, state machine 1200 shifts to state S5 if FIFO2 is half full. Otherwise, if FIFO2 is empty, state machine 1200 shifts back to ready state S0 and sets SM2_RDY, resets SM2_YTQ_VLD, and sets SM2_ZR_VLD.

From ready state S0, state machine 1200 may shift to state S5 if FIFO1_VALID, FIFO2_READY_OUT, FIFO1_CDSELECT, SM2_ZR_VLD, SM2_RDY, and SM2_ZR_VLD are present. This condition occurs when vertice is followed by a command and provides time to process the command. In shifting to state S5 from ready state S0, state machine 1200 resets SM2_RDY and sets SM2_ZR_VLD.

Figure 13:
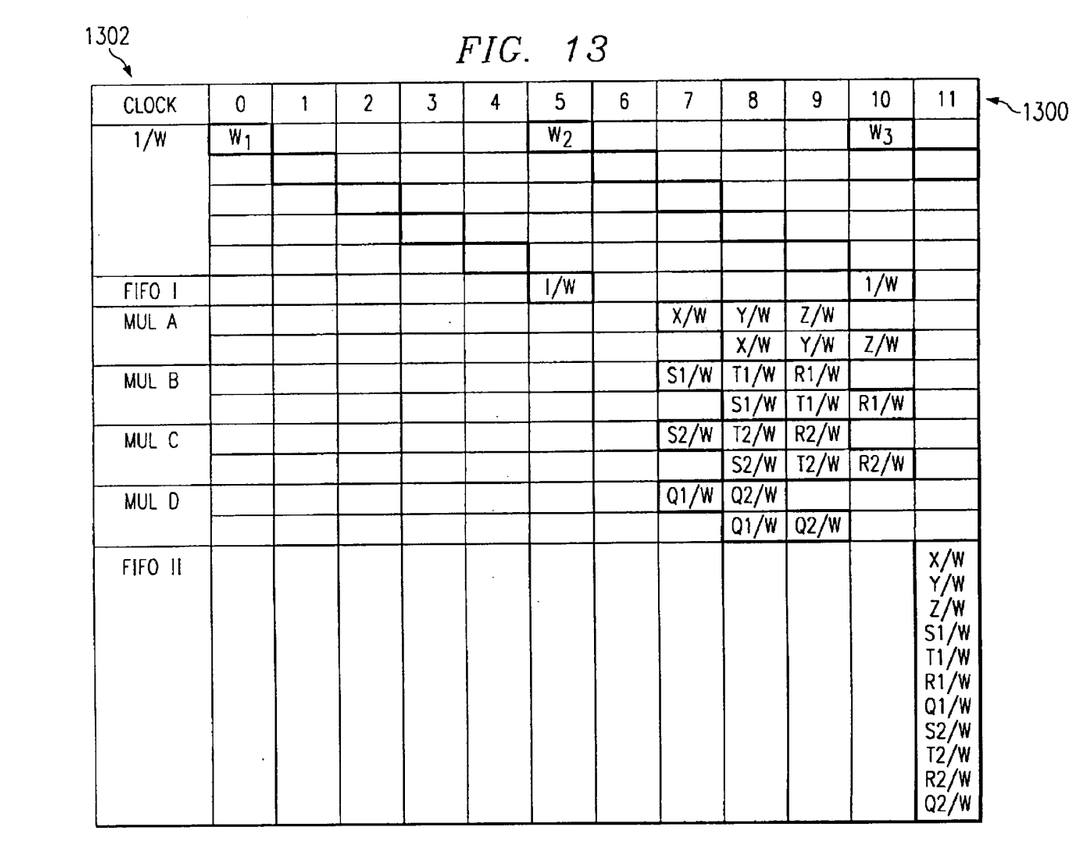
FIG. 13 is a diagram illustrating data flow in accordance with a preferred embodiment of the present invention.

Turning now to FIG. 13, a diagram illustrating data flow is depicted in accordance with a preferred embodiment of the present invention. The data flow illustrated in FIG. 13 is for data passing through the perspective division unit shown in FIGS. 9A and 9B.

Row 1300 identifies clock cycles, while column 1302 identifies devices and components. In this example, in clock cycle zero, a depth value $W_1$ is received by a reciprocator (1/W), such as reciprocator 924 in FIG. 9B. Five clock cycles pass before the reciprocal of this value is generated. On clock cycle 5, the value 1/W is placed into FIFO1, which is fragment FIFO1 908. The reciprocator receives a second depth value, $W_2$, for processing. In clock cycle 7, multiplier A begins a multiplying X by 1/W. Multiplier A is implemented as multiplier A 936. Multiplier B multiplies texture coordinate S1 with 1/W and is implemented as multiplier B 938. Multiplier C multiplies texture coordinate S2 with 1/W and is implemented as multiplier C 940. Multiplier D multiplies texture coordinate Q1 with 1/W and is implemented as multiplier D 940.

The multipliers, in these examples, are two stage multipliers requiring two clock cycles to generate a result. In clock cycle eight, in this example, multiplier A receives the Y coordinate and multiplies it with 1/W, while the final multiplication process occurs for the X coordinate. Multiplier B receives texture coordinate T1, multiplier C receives texture coordinate T2, and multiplier D receives texture coordinate Q2. These coordinates are multiplied by 1/W. As can be seen, the multiplication continues for the coordinates previously received. In clock cycle nine, multiplier A receives pixel coordinate Z. multiplier B receives texture coordinate R1, and multiplier C receives texture coordinate R2. Multiplier D does not receive another coordinate at this time because it is connected to a two input multiplexer as compared to the other multipliers, which are connected to three input multiplexers. No other values are present to be sent to multiplexer D in clock cycle nine. Multiplexer D finishes the multiplication of texture coordinate Q2 with 1/W.

In clock cycle ten, the reciprocator receives another depth value $W_3$. Additionally, a reciprocal of depth value $W_2$ is received by FIFO1. No new pixel or texture coordinates are received in clock cycle ten, instead multiplier A, multiplier B, and multiplier C complete multiplication of the coordinate values received. In clock cycle eleven, the multiplied pixel coordinates and texture coordinates are received or placed into FIFO2, which is implemented as fragment FIFO2 920 in FIGS. 9A and 9B.

The reciprocator processes the depth value in the first stage of the perspective division unit and the pixel coordinates and texture coordinates being multiplied with the reciprocal of the depth value in the second stage of the perspective division unit. Once started, pixel and texture coordinates for a vertex may be output every five clock cycles. The latency, in these examples, is twelve clock cycles before a vertex is first output when the perspective division unit receives data for processing. Depending on the particular design of the reciprocator, more or less clock cycles may occur before the reciprocal value is generated.

Thus, the mechanism of the present invention allows for correction or adjustment of pixel coordinates and texture coordinates with a depth value W. The mechanism of the present invention allows for both pixel coordinates and texture coordinates to be adjusted at the same time. Further, less time is required to perform the adjustment because the adjustment is performed using multiplication, rather than division of the coordinates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a graphics adapter for displaying an object, the method comprising:

receiving position coordinates and texture coordinates for the object;

inverting, in a first stage of a hardware pipeline, a depth coordinate associated with the position and the texture coordinates to form an inverted coordinate;

multiplying, in a second stage of the hardware pipeline, the position coordinates and the texture coordinates by the inverted coordinate to form adjusted position coordinates and adjusted texture coordinates; and displaying the object using the adjusted position coordinates and the adjusted texture coordinates.

2. A graphics pipeline comprising:

an input, wherein the input receives graphics data, wherein the graphics data includes position coordinates and a depth coordinate for an object;

an output, wherein the output transmits processed graphics data;

a plurality of processing element, wherein the plurality of processing elements generates the processed graphics data, wherein a first processing element within the plurality of processing elements is connected to the input and a last processing element within the plurality of processing elements is connected to the output, wherein a selected processing element within the plurality of processing element receives the position coordinates and the depth coordinate, inverts the depth coordinate to form an inverted depth coordinate, and multiplies the position coordinates by the inverted depth coordinate, and wherein the selected processing element comprises:

a first stage, wherein the first stage receives the position coordinates and the depth coordinate and inverts the depth coordinate; and a second stage, wherein the second stage multiplies the position coordinates by the inverted depth coordinate.

3. The graphics pipeline of claim 2, wherein:

a first stage, wherein the first stage receives the position coordinates, the texture coordinates, and the depth coordinate and inverts the depth coordinate; and a second stage, wherein the second stage multiplies the position coordinates and the texture coordinates by the inverted depth coordinate.

4. The graphics pipeline of claim 3, wherein processing of the position coordinates and the texture coordinates for an object occurs within five clock cycles.

5. A graphics adapter comprising:

an input configured to receive graphics data; a frame buffer, wherein processed graphics data is stored for display;

a raster engine connected to the input and to the frame buffer, wherein the raster engine rasterizes the processed graphics data for display; and a geometry engine connected to the raster engine, wherein the geometry engine receives the graphics data from the raster engine, processes the graphics data to form the processed graphics data, and returns the processed graphics data to the raster engine, wherein the geometry engine includes a set of processing elements in which a selected processing element within the set of processing elements receives position coordinates and a depth coordinate, inverts the depth coordinate to form an inverted depth coordinate, and multiplies the position coordinates by the inverted depth coordinate, and wherein the selected processing element comprises:

a first stage, wherein the first stage receives the position coordinates, the texture coordinates, and the depth coordinate and inverts the depth coordinate; and a second stage, wherein the second stage multiplies the position coordinate and the texture coordinates by the inverted depth coordinate.

6. The graphics adapter of claim 5, wherein processing of position coordinates and texture coordinates for an object occurs within five clock cycles.

7. A graphics adapter for displaying an object, the graphics adapter comprising:

receiving means for receiving position coordinates and texture coordinates for the object;

inverting means for inverting, in a first stage of hardware pipeline, a depth coordinate associated with the position and the texture coordinates to form an inverted coordinate;

multiplying means for multiplying, in a second stage of tie hardware pipeline, the position coordinates and the texture coordinates by the inverted coordinate to form adjusted position coordinates and adjusted texture coordinates; and displaying means for displaying the object using the adjusted position coordinates and the adjusted texture coordinates.

* * * * *

UNITED STATES PATENT AND TRADEMARK OFFICE
CERTIFICATE OF CORRECTION

PATENT NO. : 6,731,303 B1
APPLICATION NO. : 09/594630
DATED : May 4, 2004
INVENTOR(S) : Marino It is certified that error appears in the above--identified patent and that said Letters Patent is hereby corrected as shown below:

Col. 13, line 3: after "processing" delete "element" and insert --elements--.

Col. 13, lines 22-23: after "claim 2," delete "wherein: a first stage,".

Col. 13, lines 25-26: after "inverts the depth coordinate" delete "; and a second stage," and insert --,-- after "coordinate".

Col. 14, line 17: after "position" delete "coordinate" and insert --coordinates--.

Col. 14, line 30: after "stage of" delete "tie" and insert --the--.

Signed and Sealed this

Twelfth Day of June, 2007

JON W. DUDAS
*Director of the United States Patent and Trademark Office*